(12) United States Patent
Maners (10) Patent No.: US 12,345,164 B2
(45) Date of Patent: *Jul. 1, 2025

(54) ROTORS POSITIONED OUTSIDE STATORS IN EMBEDDED GENERATORS

(71) Applicant: Rolls-Royce North American Technologies, Inc., Indianapolis, IN (US)

(72) Inventor: Brian S. Maners, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,376

(22) Filed: Oct. 6, 2023

(65) Prior Publication Data

US 2025/0116201 A1  Apr. 10, 2025

(51) Int. Cl.
*F01D 15/10* (2006.01)
*B64D 27/35* (2024.01)

(52) U.S. Cl.
CPC .............. *F01D 15/10* (2013.01); *B64D 27/35* (2024.01); *F05D 2220/76* (2013.01)

(58) Field of Classification Search
CPC .............................. F01D 15/10; F05D 2220/76
See application file for complete search history.

(56) References Cited

U.S. PATENT DOCUMENTS

| | | | |
|---|---|---|---|
| 6,840,479 | B1 | 1/2005 | Przygoda et al. |
| 7,030,529 | B2 | 4/2006 | Dommsch et al. |
| 7,285,890 | B2 | 10/2007 | Jones et al. |
| 7,514,810 | B2 | 4/2009 | Kern et al. |
| 7,646,124 | B2 | 1/2010 | Himmelmann et al. |
| 10,539,076 | B2 | 1/2020 | Niergarth et al. |
| 11,130,456 | B2 | 9/2021 | Klemen et al. |

(Continued)

FOREIGN PATENT DOCUMENTS

EP  3246527 A1  11/2017

OTHER PUBLICATIONS

"Aircraft Gas Turbine Engine Lubrication System Components", 11 pp., Retrieved from the Internet on Aug. 21, 2023 from https://www.aircraftsystemstech.com.

(Continued)

*Primary Examiner* — Sean Gugger
(74) *Attorney, Agent, or Firm* — Shumaker & Sieffert, P.A.

(57) ABSTRACT

Various aspects of the techniques are directed to a turbine engine comprising a core section, a fan, and an electrical generator. The core section includes a low pressure turbine that drives a low pressure spool that rotates about a longitudinal axis of the turbine engine, a high pressure turbine that drives a high pressure spool, and a compressor rotated by the high pressure spool. The fan is connected to the low pressure spool and rotated by the low pressure spool. Rotation of the fan may provide thrust to a vehicle that includes the turbine engine. The electrical generator is positioned between the fan and the compressor. The electrical generator comprises a rotor concentric with and rotated via the low pressure spool, the rotor configured to rotate about the longitudinal axis, and a stator positioned radially within the rotor and configured to electromagnetically interact with the rotor to generate power.

19 Claims, 4 Drawing Sheets

(56) References Cited

U.S. PATENT DOCUMENTS

| | | | |
|---|---|---|---|
| 2004/0070211 A1 | 4/2004 | Franchet et al. | |
| 2017/0335795 A1* | 11/2017 | Klemen | H02K 5/203 |
| 2020/0102962 A1* | 4/2020 | Harvey | F02C 7/36 |
| 2020/0124033 A1* | 4/2020 | Rogg | F16H 57/045 |
| 2022/0228505 A1 | 7/2022 | Simonetti et al. | |
| 2022/0298923 A1* | 9/2022 | Lighty | F01D 25/18 |

OTHER PUBLICATIONS

Rolls-Royce PLC, "The Jet Engine", 1996, 292 pp., (Applicant points out, in accordance with MPEP 609.04(a), that the year of publication, 1996, is sufficiently earlier than the effective U.S. filing date, so that the particular month of publication is not an issue.).

Staunton et al., "PM Motor Parametric Design Analyses for a Hybrid Electric Vehicle Traction Drive Application - Interim Report", Oak Ridge National Laboratory, Jul. 2004, 110 pp.

Office Action from U.S. Appl. No. 18/482,366 dated Aug. 15, 2024, 15 pp.

U.S. Appl. No. 18/448,087, filed Oct. 10, 2023, naming inventors Thralls.

U.S. Appl. No. 18/482,366, filed Oct. 6, 2023, naming inventors Maners.

Thepipingtalk, "Single shaft Gas turbine, Two-shaft Gas turbine & Multi-spool Gas turbine", The Piping talk, Dec. 2021, 6 pp., Retrieved from the Internet on Nov. 1, 2023 from URL: https://thepipingtalk.com/single-shaft-gas-turbine-two-shaft-gas-turbine-multi-spool-gas-turbine/.

Response to Office Action dated Aug. 15, 2024 from U.S. Appl. No. 18/482,366, filed Nov. 15, 2024, 9 pp.

Notice of Allowance from U.S. Appl. No. 18/482,366 dated Jan. 29, 2025, 10 pp.

\* cited by examiner

ROTORS POSITIONED OUTSIDE STATORS IN EMBEDDED GENERATORS

GOVERNMENT RIGHTS

This invention was made with Government support under Grant Contract Number FA8650-19-F2078 awarded by Air Force Research Laboratory (AFRL). The Government has certain rights in the invention.

TECHNICAL FIELD

This disclosure relates to electrical power generation in turbine engines.

BACKGROUND

A turbine engine is a type of internal combustion engine that may drive an electric generator for converting mechanical power produced by the turbine engine to electrical power used by other components of a system. Some applications (e.g., due to size and weight restrictions) may require the electric generator to be located within the housing of the turbine engine. During operation, some internally-located electric generators may produce excess heat that may interfere with operations being performed by the electric generator and/or other collocated components of the turbine engine. In addition, performing maintenance or inspections of some internally-located electric generators may be difficult as other collocated components of the turbine engine obstruct access to the electric generator.

SUMMARY

Recently, demand for electrical power on vehicles (e.g., aircraft and others) has increased. For example, larger electronics and/or hybrid consideration has encouraged incorporation of new or additional electrical generator capability on turbine engines, including turbofans. Electrical generators may be positioned at various locations on turbine engines. As one example, an electrical generator may be positioned inside a tail cone of the engine. However, the tail cone may be exposed to hotter turbine temperatures, which may degrade generator performance. As another example, an electrical generator may be positioned on an outside of the turbine engine and be driven by a drive shaft off a compressor. However, positioning the generator on the outside may be limiting due to size constraints (e.g., on generator physical size).

An electrical generator may be positioned in a cavity behind a fan rotor of a turbine engine. For instance, the electrical generator rotor and stator may be concentric with a drive shaft of the fan, and may be placed in a space between the fan rotor and the first compressor stage. Such a location may provide various advantages (e.g., over tail cone or external generator positions). For instance, temperatures in such a space may be relatively low, which may improve generator performance. Furthermore, there may be a relatively large volume available, which may enable use of a larger generator (e.g., for a wider range of power extraction options). As another example, positioning the electrical generator in said cavity may enable integration of the electrical generator with existing engine components, such as a core vane. In this way, this disclosure may enable turbine engine to include relatively larger and/or relatively more efficient electrical generators.

In addition, the electrical generator may, in some instances, be positioned outside of a sump forming part of a larger lubrication system for distributing a lubricant (e.g., oil) to various rotating elements to facilitate rotation of various spools (or in other words, shafts), gears, the electrical generator itself, etc. The lubrication system may include pumps for distributing the oil via ducts within the turbine engine and sprayers (which may also be referred to as "jets") for applying the oil to the rotating elements. The sump (which may represent an oil wetted sump) acts as a collection and storage basin for recovering (or in other words, scavenging) oil applied to the rotating elements. The oil wetted sump may store the oil and pump the oil through filters (to remove any debris) and cooling systems, before being returned for application to the rotating elements.

By placing the electrical generator outside of the oil sump, the electrical generator driven by a low pressure (LP) spool coupled to an LP (N1) turbine stage may have a larger diameter of operation to offset the relatively lower revolutions per minute compared to a high pressure (HP) spool driven by a HP (N2) turbine stage. That is, the oil sump is usually displaced adjacent to the LP spool, which runs along a center line of the turbine engine, which may result in an electric generator that is positioned within the oil sump having a smaller diameter compared to an electric generator placed outside of the oil sump. Moreover, placing the electric generator outside of the oil sump, such as in the cavity noted above, may allow for easier maintenance while also reducing the possibility of contaminating the lubrication system through injection of debris by the electric generator.

Furthermore, the rotor may, in some examples, be located axially outside of the stator within the electric generator. Placing the rotor axially outside of the stator may increase power generation compared to placing the rotor axially inside of the stator given that placing the rotor outside of the stator may result in a yet larger diameter. That is, placing the rotor axially outside of the stator may potentially result in an improvement regarding surface feet per minute (SFpM). This SFpM improvement may translate directly into more electrical power generation potential.

In one example, various aspects of the techniques are directed to a turbine engine comprising: a core section comprising: a low pressure turbine that drives a low pressure spool that rotates about a longitudinal axis of the turbine engine; a high pressure turbine that drives a high pressure spool; and a compressor rotated by the high pressure spool; a fan comprising a plurality of radially distributed blades, the fan connected to the low pressure spool and rotated by the low pressure spool, rotation of the plurality of radially distributed blades providing thrust to a vehicle that includes the turbine engine; and an electrical generator positioned between the fan and the compressor, wherein the electrical generator comprises: a rotor concentric with and rotated via the low pressure spool, the rotor configured to rotate about the longitudinal axis; and a stator positioned radially within the rotor and configured to electromagnetically interact with the rotor to generate power.

In another example, various aspects of the techniques are directed to a method comprising: operating a turbine engine to provide thrust to a vehicle that includes the turbine engine, wherein the turbine engine comprises: a core section comprising: a low pressure turbine that drives by a low pressure spool; and a high pressure turbine that drives by a high pressure spool; a compressor rotated by the high pressure spool; a fan comprising a plurality of radially distributed blades, the fan connected to the low pressure spool and rotated by the low pressure spool, rotation of the plurality of radially distributed blades providing thrust to a vehicle that includes the turbine engine; and an electrical generator positioned between the fan and the compressor, wherein the electrical generator comprises: a rotor concentric with and rotated via the low pressure spool, the rotor configured to rotate about the longitudinal axis; and a stator positioned radially within the rotor and configured to electromagnetically interact with the rotor to generate power; and operating the electrical generator via the mechanical connection to the turbine engine to output power.

In another example, various aspects of the techniques are directed to an aircraft comprising: an airframe; and a turbine engine coupled to the airframe, the turbine engine comprising: a core section comprising: a low pressure turbine that drives a low pressure spool; and a high pressure turbine that drives a high pressure spool; a compressor rotated by the high pressure spool; a fan comprising a plurality of radially distributed blades, the fan connected to the low pressure spool and rotated by the low pressure spool, rotation of the plurality of radially distributed blades providing thrust to the airframe; and an electrical generator positioned between the fan and the compressor, wherein the electrical generator comprises: a rotor concentric with and rotated via the low pressure spool, the rotor configured to rotate about the longitudinal axis; and a stator positioned radially within the rotor and configured to electromagnetically interact with the combined rotor to generate power.

In one example, various aspects of the techniques are directed to a turbine engine comprising: a core section comprising: at least one compressor and at least one turbine that both rotate about a longitudinal axis of the turbine engine, wherein the at least one turbine drives at least one spool; and an oil sump positioned to collect oil used to lubricate rotational elements for one or more of the at least one compressor and the at least one turbine; a fan comprising a plurality of radially distributed blades and rotated by the at least one spool, the fan connected to the core section and configured to be rotated by the at least one spool, rotation of the plurality of radially distributed blades providing thrust to a vehicle that includes the turbine engine; and an electrical generator integrated into the core section and positioned outside of the oil sump, wherein the electrical generator comprises: a rotor rotated via the at least one spool, the rotor configured to rotate about the longitudinal axis; and a stator configured to electromagnetically interact with the rotor to generate power.

In another example, various aspects of the techniques are directed to a method comprising: operating a turbine engine to provide thrust to a vehicle that includes the turbine engine, wherein the turbine engine comprises: a core section including: at least one compressor and at least one turbine that both rotate about a longitudinal axis of the turbine engine, wherein the at least one turbine drives at least one spool; and an oil sump positioned to collect oil used to lubricate rotational elements for one or more of the at least one compressor and the at least one turbine; a fan comprising a plurality of radially distributed blades and rotated by the at least one spool, the fan configured to be rotated by the at least one spool, rotation of the plurality of radially distributed blades providing thrust to a vehicle that includes the turbine engine; and an electrical generator integrated into the core section and positioned radially outside of the oil sump, wherein the electrical generator comprises: a rotor rotated by the at least one spool, the rotor configured to rotate about the longitudinal axis; and a stator configured to electromagnetically interact with the rotor to generate power; and operating the electrical generator via a mechanical connection to the turbine engine to output power.

In another example, various aspects of the techniques are directed to an aircraft comprising: an airframe; and a turbine engine comprising: a core section including: at least one compressor and at least one turbine that both rotate about a longitudinal axis of the turbine engine, wherein the at least one turbine drives at least one spool; and an oil sump positioned to collect oil used to lubricate rotational elements for one or more of the at least one compressor and the at least one turbine; a fan comprising a plurality of radially distributed blades and rotated by the at least one spool, the fan connected to the core section and configured to be rotated by the at least one spool, rotation of the plurality of radially distributed blades providing thrust to a vehicle that includes the turbine engine; and an electrical generator integrated into the core section and positioned radially outside of the oil sump, wherein the electrical generator comprises: a rotor rotated via the at least one spool, the rotor configured to rotate about the longitudinal axis; and a stator configured to electromagnetically interact with the rotor to generate power.

The details of one or more examples are set forth in the accompanying drawings and the description below. Other features, objects, and advantages will be apparent from the description and drawings, and from the claims.

DETAILED DESCRIPTION

Figure 1:
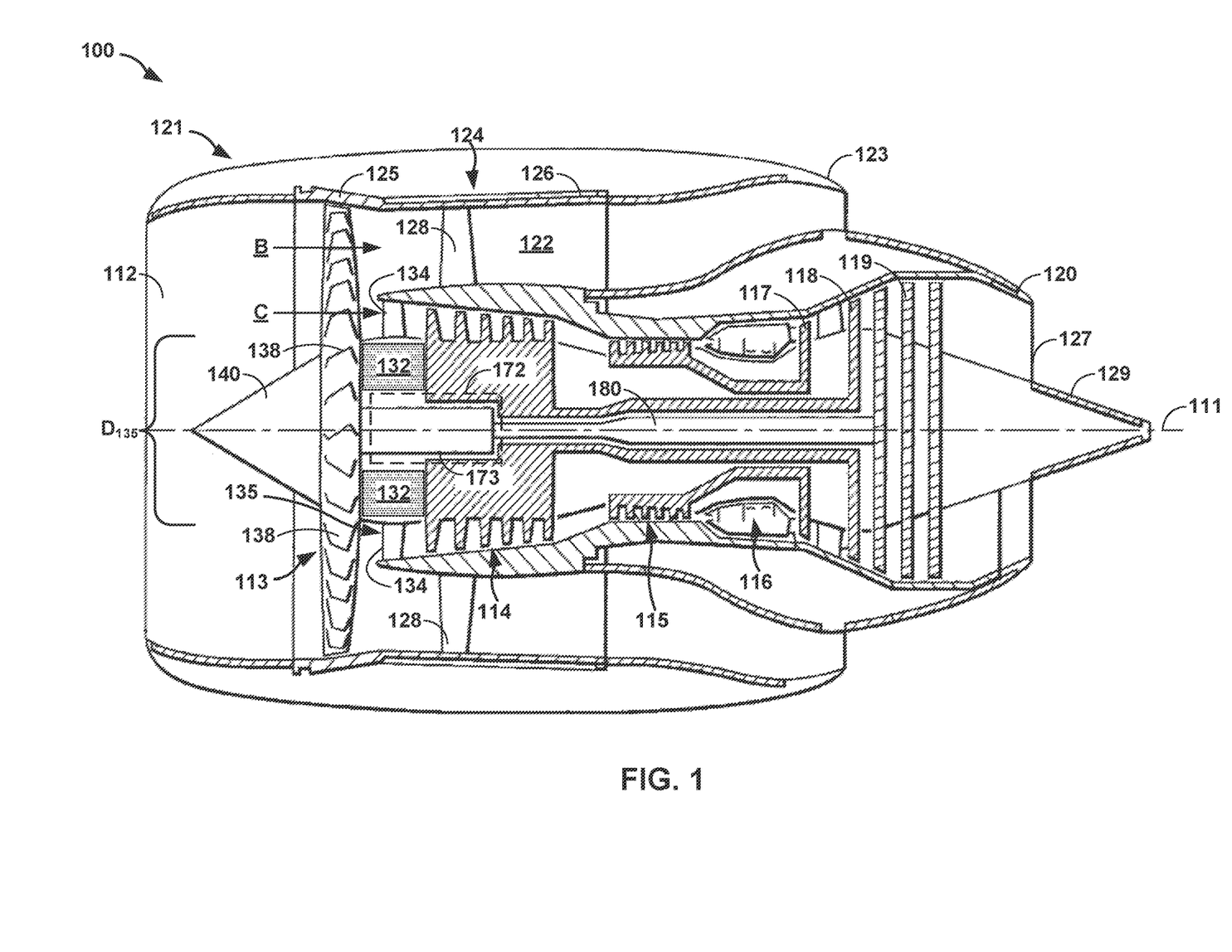
FIG. 1 is a conceptual diagram illustrating a cross-section of turbine engine 100 with an electric generator 132 for producing electrical power, in accordance with one or more aspects of this disclosure.

FIG. 1 is a conceptual diagram illustrating a cross-section of turbine engine 100 with an electric generator 132 for producing electrical power, in accordance with one or more techniques of this disclosure. Turbine engine 100 may be configured to convert one form of power to mechanical energy in the form of a rotating turbine. The mechanical energy produced by turbine engine 100 may be used in a variety of ways or for a variety of systems and applications (e.g., aircraft, locomotives, watercraft, power plants, electric generators, and any or all other systems and applications that rely on mechanical energy from a turbine engine to perform work). As illustrated in FIG. 1, turbine engine 100 may be a ducted fan gas-turbine engine, which may be used to propel an aircraft.

As shown in FIG. 1, Turbine engine 100 has a principal and rotational axis 111. Turbine engine 100 may include, in axial flow series, an air intake 112, propulsive fan 113, intermediate pressure compressor 114, high-pressure compressor 115, combustion equipment 116, high-pressure turbine 117, intermediate pressure turbine 118, low-pressure turbine 119, and core exhaust nozzle 120. Turbine engine 100 may include nacelle 121, which may generally surround turbine engine 100 and defines air intake 112, a bypass duct 122, and an exhaust nozzle 123. Turbine engine 100 may include a center-plug 129, which is positioned within a core exhaust nozzle 120 to provide a form for the core gas flow C to expand against and to smooth its flow from the core engine. Centre-plug 129 may extend rearward of the core nozzle's exit plane 127.

Turbine engine 100 may operate such that air entering the intake 112 is accelerated by fan 113 to produce two air flows: a first airflow C (i.e., "core airflow") into intermediate pressure compressor 114 and a second airflow B (i.e., "bypass airflow") which passes through bypass duct 122 to provide propulsive thrust to an airframe (e.g., a body of an airplane). Turbine engine 100 may be a high-bypass engine (e.g., a ratio of B to C is greater than a threshold ratio) or a low-bypass engine (e.g., a ratio of B to C is less than the threshold ratio). Intermediate pressure compressor 114 may compress the airflow C directed into it before delivering that air to the high-pressure compressor 115 where further compression may occur.

The compressed air exhausted from the high-pressure compressor 115 may be directed into combustion equipment 116 where it is mixed with fuel and the mixture combusted. The resultant hot combustion products may then expand through, and thereby drive the high, intermediate and low-pressure turbines 117, 118, 119 before being exhausted through nozzle 120 (and may thereby provide additional propulsive thrust to the airframe). The high, intermediate and low-pressure turbines 117, 118, 119 may respectively drive the high and intermediate pressure compressors 115, 114 and the fan 113 by suitable interconnecting shafts. For instance, turbine engine 100 may include low-pressure (LP) shaft 180 (which may also be referred to as "LP spool 180") that rotationally connects turbine 119 to fan 113.

While illustrated and described as a multi-shaft design, turbine engine 100 is not so limited. For instance, in some examples, turbine engine 100 may be a single shaft design (e.g., without separate HP/LP spools). Similarly, aspects of this disclosure are applicable to turbine engines of all ranges of thrust and sizes.

As noted above, fan 113 may be rotated using energy collected via turbine 119 (e.g., a power-turbine). As shown in FIG. 1, fan 113 may include a plurality of fan blades 138 connected to hub 140. Fan 113 may be circumferentially surrounded by a structural member in the form of a fan casing 124 (e.g., where turbine engine 100 is a ducted turbo-fan engine), which may be connected to an annular array of outlet guide vanes 128. Fan casing 124 may comprise a rigid containment casing 125 and attached rearwardly thereto is rear fan casing 126. As shown in FIG. 1, fan 113 (and/or other components of the engine core such as the high and intermediate pressure compressors 115, 114) may be connected to core vane assembly 135. Core vanes 134 may provide several functions. For instance, in addition to or in place of supporting fan 113, core vanes 134 may be shaped and arranged to straighten core airflow C before it reaches compressor 114. While illustrated in FIG. 1 as being a directly driven fan, in other examples fan 113 may be a geared turbofan. For instance, turbine engine 100 may include a gearbox mechanically between turbine 119 and fan 113. Core vane assembly 135 may have diameter $D_{135}$, which may approximately correspond to a diameter of at least a forward section of compressor 114.

One or more components of turbine engine 100 may be considered to form a core section. For instance, one or more of compressor 114, compressor 115, combustion equipment 116, and turbines 117, 118, 119 may form the core section of turbine engine 100.

Turbine engine 100 may include electrical generator 132, which may be positioned in a cavity behind fan 113 (e.g., aft of fan hub 140). Electrical generator 132 may be any type of electrical generator and may generally include a rotor and a stator that rotate relative to each other. The rotor and the stator of electrical generator 132 may be concentric with a drive shaft of fan 113 (e.g., a shaft connecting turbine 119 to fan 113), and may be placed in a space between fan 113 and compressor 114. The stator may be configured to electromagnetically interact with the rotor to generate power.

Such a location may provide various advantages (e.g., compared to tail cone and/or external positions). For instance, temperatures in such a space may be relatively low, which may improve performance of electrical generator 132 (e.g., as performance of electrical generators may degrade when excessive heat is produced during operation). Furthermore, there may be a relatively large volume available, which may enable use of a larger generator (e.g., for a wider range of power extraction options). As another example, positioning electrical generator 132 in said cavity may enable integration of electrical generator 132 with existing engine components, such as a core vane (e.g., core vane 135 of FIG. 2). In this way, this disclosure may enable turbine engine 100 to include relatively larger and/or relatively more efficient electrical generators.

In accordance with various aspects of the techniques described in this disclosure, electrical generator 132 may include a separate blade retainer, the rotor mechanically coupled to the separate blade retainer (e.g., via nuts, bolts, screws, clamps, etc.) via a rotor arm (which may be a monolithically manufactured as part of the rotor), and a stator. The blade retainer may refer to a mechanical component configured to retain a plurality of radially distributed blades 138 (e.g., a back blade retainer that retains a back end of blades 138). The separate rotor is not "combined" in the sense that the rotor and blade retainer (and possibly the seal) are not manufactured as a single monolithic component. The separate blade retainer may be positioned radially outside of the stator or radially inside of the stator.

In other words, electrical generator 132 may be integrated into core vane assembly 135 and positioned in the core section aft of the separate blade retainer that retain fan blades 138 and fore of at least one compressor (i.e., compressor 114 in the example of FIG. 1). While not shown in the example of FIG. 1, electrical generator 132 may include a rotor rotationally coupled to the separate blade retainer, where the rotor may be mechanically attached via fixtures, such as nuts and bolts, screws, clamps, etc. to the separate blade retainer.

The separate blade retainer may be a distinct component from the rotor, where the separate blade retainer does not integrate the rotor to form one monolithic component. The blade retainer may be rotationally coupled to LP spool 180, which rotates fan 113 via a fan shaft 173. As such, the rotor is thereby mechanically coupled to LP spool 180, which has a lower revolutions per minute (RPMs) than the HP spool (e.g., the LP spool may rotate at approximately 2,500-5,000 RPMs while the HP spool may rotate at approximately 9,000-15,000 RPM). However, given the larger diameter of electrical generator 132 when positioned in the core of turbine engine 100 fore of compressor 114, power generation by electrical generator 132 may be increased despite the lower RPMs. As noted above, the stator may be configured to electromagnetically interact with the rotor to produce power. To further increase power (by way of a larger diameter), the rotor may be positioned radially outside of the stator.

As noted above, positioning electrical generator 132 in the cavity behind fan 113 may provide several benefits. For instance, the large volume available may allow for larger sized components of electrical generator 132. As one example, an outer diameter of electrical generator 132 may be a large percentage of a diameter of core vane assembly 135 (e.g., 70%, 80%, 90%, 95%, etc.). This diameter can be further expanded by positioning the rotor outside of the stator as noted above.

Electrical generator 132 may be any type of electrical generator. Examples of electrical generator 132 include, but are not limited to, alternators, dynamos, permanent magnet generators, field wound generators, synchronous, asynchronous, brushed, brushless, etc. In general, electrical generator 132 may include a stator, and a rotor configured to rotate relative to the stator, where the stator is configured to electromagnetically interact with the rotor.

In operation, turbine engine 100 may include the core section described herein in more detail. The core section may include at least one compressor 114/115 and at least one turbine (e.g., turbines 117, 118, and/or 119) that both rotate about a longitudinal axis 111 of turbine engine 100. Turbine engine 100 may also include fan 113 connected to the core section and configured to be rotated by the at least one turbine 117, 118, and/or 119, rotation of fan 113 providing thrust to the vehicle that includes turbine engine 100 (such as airplane having an airframe). Turbine engine 100 also includes electrical generator 132 integrated into core vane assembly 135 and positioned in the core section aft of fan 113 and fore of the at least one compressor 117/118/119.

Although not shown in detail in the example of FIG. 1 (but shown in more detail with respect to the example of FIG. 2), electrical generator 132 may include a separate rotor mechanically rotated by the turbine of electrical generator 132, the separate rotor configured to rotate about longitudinal axis 111 and formed from a single component that is mechanically coupled to a blade retainer, which rotates about longitudinal axis 111. Electrical generator 132 may also include a stator configured to electromagnetically interact with the combined rotor. Given that the blade retainer may couple to the LP spool, the rotor may have approximately the same RPMs as the LP spool, but when positioned radially further towards the outside of turbine engine 100, provides a larger diameter to improve power generation despite the slower speeds.

Although not shown in the example of FIG. 1, electrical generator 132 may be positioned within an oil sump 172 (e.g., adjacent to fan shaft 173) that is configured to collect oil used to lubricate rotating elements (e.g., fan shaft 173, LP spool 180, the intermediate pressure-IP-spool when present, the HP spool, bearings, gears, etc.) considering that the oil sump may be unused open space during operation of turbine engine 100. Alternatively, electrical generator 132 may be positioned radially outside of (not within) oil sump 172 (as depicted in the example of FIG. 1), which results in a larger diameter for electrical generator 132 and thereby may promote more power generation for the reasons noted above.

The space within the core section of turbine 100 where electrical generator 132 is positioned radially outside of oil sump 172 may occur due to placement of the intake for core air flow C. This core air inlet (provided by a core vane assembly) may be placed radially outside at a sufficient distance such that fan 113 may introduce a maximum (or some amount of air flow above a threshold) for core air flow C, thereby creating a cavity within the housing of turbine engine 100 in which electrical generator 132 may be positioned.

Sump 172 may form part of a larger lubrication system (which is not shown in extensive detail in FIG. 1 for ease of illustration purposes) for distributing a lubricant (e.g., oil) to various rotating elements (e.g., bearings, gears, splines, etc.) to facilitate rotation of fan shaft 173, LP spool 180, gears, the electrical generator itself, etc. The lubrication system may include pumps for distributing the oil via ducts within turbine engine 100 and sprayers for applying the oil to the rotating elements. Oil sump 172 (which may represent an oil wetted sump and hence may also be referred to as "oil wetted sump 172") acts as a collection and storage basin for recovering (or in other words, scavenging) oil applied to the rotating elements. Oil wetted sump 172 may store the oil and include a pump by which to direct the oil through filters (to remove any debris) and cooling systems, before being returned for application to the rotating elements.

By placing electrical generator 132 outside of oil sump 172, electrical generator 132 driven by a low pressure (LP) spool coupled to an LP (N1) turbine 119 may have a larger diameter of operation to offset the relatively lower revolutions per minute (RPMs) provided by a high pressure (HP) spool driven by a HP (N2) turbine 117. That is, oil sump 172 is usually displaced adjacent to LP spool 180 as shown in the example of FIG. 1, which runs along a center line of turbine engine 100, which may result in an electric generator that is positioned within oil sump 172 having a smaller diameter compared to an electric generator placed outside of oil sump 172. Moreover, placing electric generator 132 outside of oil sump 172, such as in the cavity noted above, may allow for easier maintenance while also reducing the possibility of contaminating the lubrication system through injection of debris by electric generator 132. The configuration of electrical generator 132 is described in more detail with respect to the example of FIG. 2.

Figure 2:
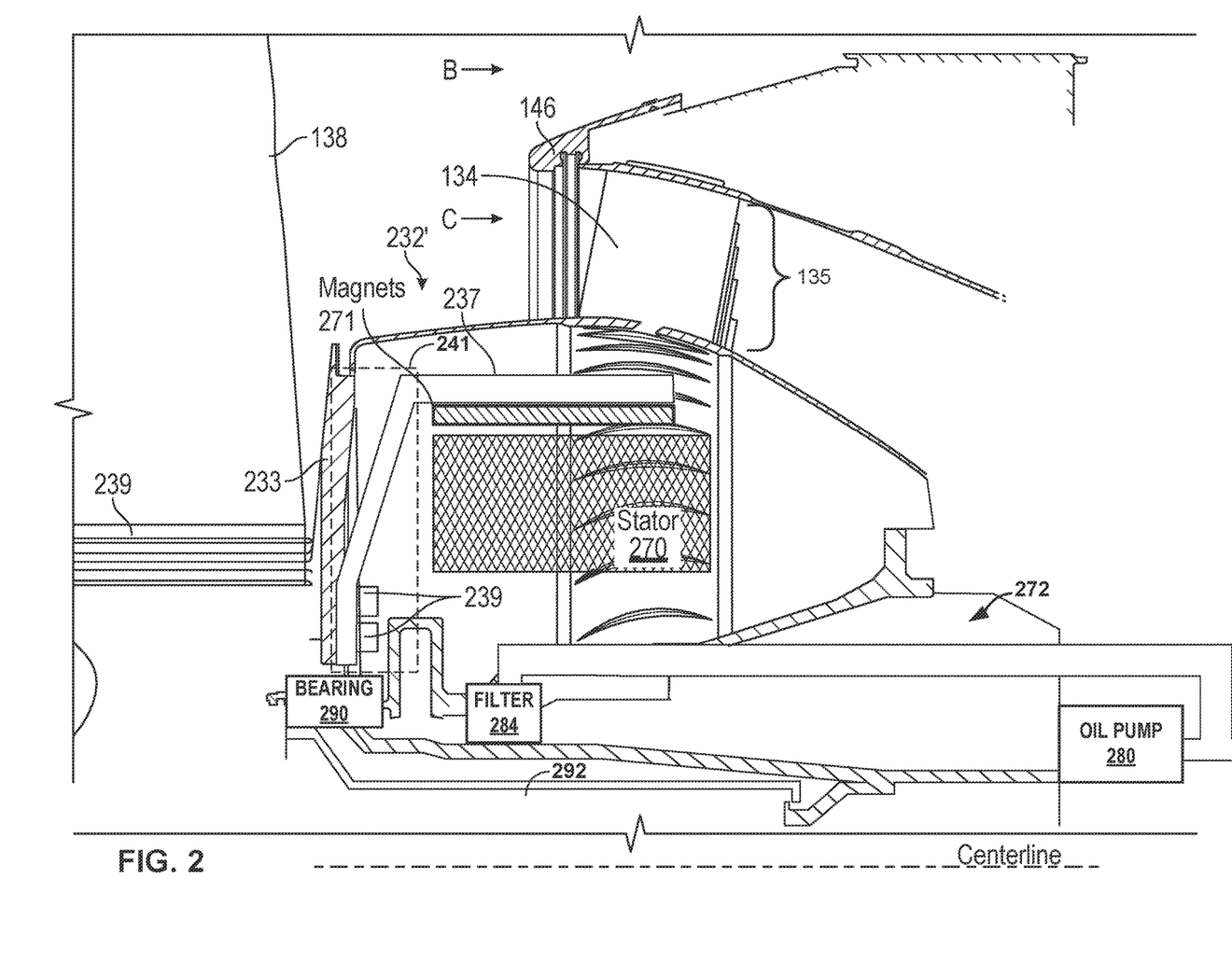
FIG. 2 is conceptual diagrams illustrating, in more detail, the electrical generator of FIG. 1 positioned in accordance with various aspects of this disclosure.

FIG. 2 is conceptual diagrams illustrating, in more detail, the electrical generator of FIG. 1 that includes a combined rotor in accordance with various aspects of the techniques described in this disclosure. In the example of FIG. 2, an electrical generator 232 may include a separate rotor 237 that is mechanically coupled to a blade retainer 233 via attachments 239 (which may also be referred to as "fixtures 239"). Electrical generator 232 may represent one example of electrical generator 132 in which rotor 237 is displaced radially outside of a stator 270 of electrical generator 132. Although rotor 237 is displaced radially outside of stator 270 in the example of FIG. 2, it should be understood that stator 270 may be displaced radially outside of rotor 237.

Separate rotor 237 may include an integrated rotor arm 241 that is manufactured as a monolithic component as a part of separate rotor 237. Rotor arm 241 may define mechanical coupling portions (e.g., threads in a hole, a hole, etc.) that facilitate attachment to blade retainer 233 via fixtures 239. Fixtures 239 may represent any type of mechanical fixture for mechanically coupling rotor 237 to blade retainer 233. Fixtures 239 may, for example, represent screws, nuts and bolts, clamps, or any other type of mechanical coupling or fixture.

Electrical generator 232 also includes magnets 271 displaced along rotor 237. Magnets 271 may represent permanent magnets, which may be formed via rare earth metals (which may produce a strong magnetic field and increase power production for electrical generator 232).

As shown in the example of FIG. 2, only a portion of the turbine engine (e.g., turbine engine 100) is shown (e.g., a cross sectional top half of the front portion of the turbine is shown). Electrical generator 232 is positioned aft of blade retainer 233 (which may represent a back blade retainer) and in the core section of turbine engine 100. Electrical generator 232 is positioned radially within core vanes 134 (which may form a portion of core vane assembly 135). Electrical generator 232 is positioned adjacent to core gas flow C (which may also be referred to as "core air inlet C"). Core air inlet C may represent an intake to core vane assembly 135 of air or other fluids at ambient temperature (which may be significantly cooler than air in later stages of turbine engine 100, especially when at altitude when ambient air temperatures are reduced compared to ambient air temperatures on the ground).

Electrical generator 232 is, in the example of FIG. 2, also positioned radially outside of an oil sump 272. Oil sump 272 may represent a wet oil sump in which the oil is stored within turbine engine 100. Wet oil sump 272 may include one or more jets coupled to an oil pump that displaces oil onto bearings for the shaft (e.g., the LP spool, the HP spool, etc.), gears, and other interacting mechanical components of turbine engine 100.

Oil sump 272 may represent a volume in which oil collects after being displaced by pump and applied to the mechanical components, possibly providing cooling for applied oil via circulation back to the wet oil sump 272. In other words, wet oil sump 272 is positioned to collect oil used to lubricate rotational elements (e.g., bearing, gears, shafts, etc.) for fan 113 along with other components, such as compressor 114 and at least one turbine 117/118/119.

While electrical generators may be mechanically coupled to the HP spool (which rotates at higher revolutions per minute—RPMs—than the LP spool and thereby generates more power), electrical generator 232 is mechanically coupled to the LP spool due to issues with power extraction via the HP spool (given limitations on how much power can be provided on existing turbine engine configurations due to limits on shaft and bearing size from the internal gearbox to the external gearbox). As such, electrical generator 232 is not mechanically attached or otherwise driven by an auxiliary gearbox mechanically coupled to the core section. Further, HP power spool extraction may be limited due to surge margins of turbine engine 100.

Because this core portion of turbine engine 100 shown in FIG. 2 is adjacent to core flow inlet C, air temperatures are, as noted above, relatively cool, which may facilitate power generation and reliability). Further, placing electrical generator 232 at the front of turbine engine 100 in a dry space (e.g., not in oil wetted sump 272) allows for potentially easier access for service (compared to placing electrical generator 232 within wet oil sump 272, a tail cone, etc.). By removing fan blades 138 and blade retainer 233, electrical generator 232 may be exposed for repair and/or replacement.

In addition, moving electrical generator 232 outside of wet oil sump 272 may reduce the risk of oil system contamination, which may also improve overall system reliability, while also potentially avoiding the introduction of any additional bearings to the turbine engine configuration (which also facilitates reliability of turbine engine 100). Separation of electrical generator 232 and wet oil sump 272 may reduce contamination in that any debris produced through operation or failure of electrical generator 232 may be collected by oil used to lubricate electrical generator 232.

The lubrication system (which may include one or more oil pumps, one or more oil filters, one or more jets for oil application, oil sump 272 for collecting applied oil, air cooling components for reducing heat from collected oil, etc.) may collected the oil and filter out, via the one or more filters, the debris produced by electrical generator 232. Placing electrical generator 232 in wet oil sump 272 may allow debris produced by the electrical generator 232 to contaminate the lubrication system and potentially result of injection of such debris (produced by electrical generators placed within oil sump 272) to mainline bearings for the LP spool and/or HP spool as well as possibly other components of the turbine engine, such as fan 113. Such contamination may be undesirable.

As such, in accordance with one or more aspects of this disclosure and a discussed above, electrical generator 232 may be located outside of oil sump 272 (e.g., outside of the bounded volume in which oil is designed to collect for redistribution). In this way, any contaminants produced by electrical generator 232 may not be transported to other components of turbine engine 100 via oil sump 272. In addition, with electrical generator 232 being located outside of oil sump 272, maintenance access to electrical generator 232 may be simplified. For instance, a maintenance technician may be able to access electrical generator 232 without having to open oil sump 272, which may be a time consuming and messy endeavor. As one example, the maintenance technician may access electrical generator 232 for repair or replacement by removing fan 113 (e.g., without disturbing oil sump 272).

Oil sump 272 may represent a fan oil sump used for collecting oil applied to one or more bearings that facilitate rotation of fan 113. Generally, fan oil sump 272 (which is another way to refer to oil sump 272) is designed as small as possible (e.g., to reduce weight and size of the turbine engine), which makes placement of an electrical generator within wet oil sump 272 difficult when attempting to generate sufficient power for various applications. Fan oil sump 272 may collect oil applied to the one or more bearings for fan 113, filtering and pumping the collected oil back to air cooled compartments for heat reduction before being reapplied throughout turbine engine 100.

The portion of the lubrication system shown in the example of FIG. 2A may include an oil pump 280, and an oil filter 284. Oil pump 280 may represent a fan sump oil pump configured to pump oil (or another lubricant) stored by fan oil sump 272 used to lubricate the above noted rotating element, such as a fan shaft bearing 290, a fan shaft 292, the LP spool (which mechanically couples to fan shaft 292 and is not shown in the example of FIG. 2), etc.

Fan sump oil pump 280 (which is another way to refer to oil pump 280) may pump oil to electric generator 232 (e.g., to cool stator 270) and thereby cool electric generator 232 to facilitate rotation and cooling. Electric generator 232 may be fluidically coupled to oil sump 272 such that oil can be returned to oil sump 272 for collection, filtering, and cooling (via a heat exchanger which is not shown in the example of FIG. 2A).

Filter 284 may represent an oil filter configured to filter debris from collected oil, which may be returned to fan oil sump 272 for reapplication to the rotating elements via intake by oil pump 280. In some examples, oil may be returned to the larger lubrication system in which a central (or, in other words, main) oil sump may act as an overall reservoir for storage of oil used by the entirety of turbine 100. The larger lubrication system may include the heat exchanger (or, in other words, a cooler) used for cooling applied oil, overflow valves (for reducing excessive oil pressure generated during operation of turbine engine 100), etc.

Fan shaft bearing 290 may reduce friction and facilitate rotation of fan shaft 292. Fan shaft bearing 290 may also stabilize fan shaft 292. To reduce wear due to excessive friction caused by rotating elements (i.e., fan shaft 282 in this example), oil present in fan oil sump 272 may lubricate fan shaft bearing 290. Alternatively, a jet (which may also be referred to as a "sprayer") may be displaced adjacent to bearing 290, where such jet may spray oil on bearing 290. Fan sump oil pump 290 may displace oil in this manner to lubricate fan shaft 292, bearing 290, and other rotating elements.

In instances where electric generator 232 is placed within fan oil sump 272, electric generator 232 may potentially contaminate oil when electric generator 232 creates debris due to the speed of rotation, misalignment of rotor 237, etc. In addition, when the electric generator is disposed within fan oil sump 272, maintenance of electric generator 232 is complicated given that accessing fan oil sump 272 may require extensive teardown of turbine engine 100 to access the electrical generator when placed within fan oil sump 272 while also requiring that all oil be drained from turbine engine 100 (or at least fan oil sump 272).

In the example of FIG. 2, rotor 237 is positioned radially outside of stator 270, which may increase the circumferential distance traveled by rotor 237 compared to when rotor 237 is positioned radially within stator 270. By using rotor 237 positioned radially outside of stator 270, an output capacity of electrical generator 232 may be increased relative to configurations where rotor 237 is positioned radially inside of stator 270. Because rotor 237 is positioned at a larger diameter than when positioned radially inside of stator 270, electrical generator 232 has a possible improvement regarding surface feet per minute (SFpM). This SFpM improvement may translate directly into more electrical power generation potential.

In addition, with rotor 237 positioned outside of stator 270, there is no need for a rotor sleeve which may be used to contain the rotor magnets (shown in the example of FIG. 2B) under rotational conditions. Because there is no rotor sleeve, active components of rotor 237 and stator 270 are radially closer together, which may also result in possibly more electrical power generation potential.

Figure 3:
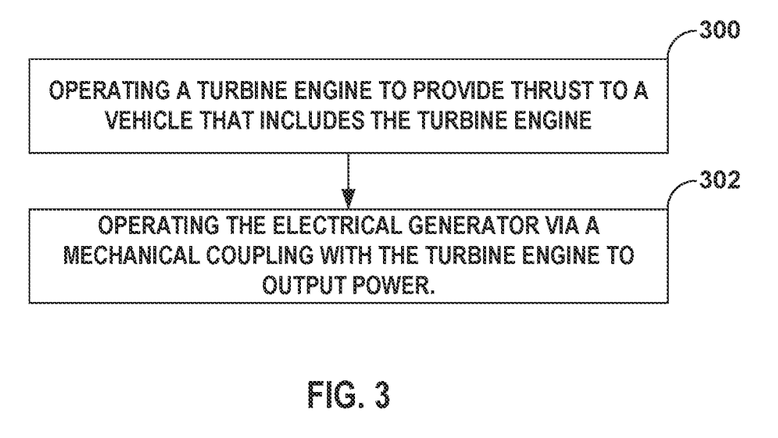
FIG. 3 is a flowchart illustrating example operation of the electrical generator shown in the example of FIGS. 1-2B in accordance with various aspects of the techniques described in this disclosure.

FIG. 3 is a flowchart illustrating example operation of the electrical generator shown in the example of FIG. 1 shown in the example of FIG. 2 in accordance with various aspects of the techniques described in this disclosure. As discussed above with respect to the example of FIG. 1, turbine engine 100 may include the core section described herein in more detail. The core section may include at least one compressor 114/115 and at least one turbine (e.g., turbines 117, 118, and/or 119) that both rotate about a longitudinal axis 111 of turbine engine 100. Turbine engine 100 may also include fan 113 connected to the core section and configured to be rotated by the at least one turbine 117, 118, and/or 119, rotation of fan 113 providing thrust to the vehicle that includes turbine engine 100 (such as airplane having an airframe). Turbine engine 100 also includes electrical generator 132 integrated into core vane assembly 135 and positioned in the core section aft of fan 113 and fore of the at least one compressor 114.

Although not shown in detail in the example of FIG. 1 (but shown in more detail with respect to the examples of FIGS. 2A and 2B), electrical generator 132, 232, and/or 232' ("electrical generator 132/232/232") may include a turbine configured to extract work from a core fluid flow, the turbine configured to rotate about longitudinal axis 111. Electrical generator 132/232/232' may also include a rotor 237 mechanically rotated by the turbine of electrical generator 132/232/232', rotor 237 may be configured to rotate about longitudinal axis 111 and formed from a single component that is mechanically attached to blade retainer 233 (FIG. 2A and/or 2B) for electrical generator 132/232/232'. Electrical generator 132/232/232' may also include stator 270.

A vehicle, such as an airplane, may include a controller (such as full authority digital engine control-FADEC) that operates turbine engine 100 to provide thrust to the airplane (and more specifically an airframe of the airplane) that includes turbine engine 100 (300). By operating turbine engine 100, electrical generator 132/232/232' may operate via a mechanical coupling (e.g., a clutch for optional operation, a direct link for continuous operation, etc.) with turbine engine 100 to output power. In other words, operating turbine engine 100 may operate electrical generator 132/232/232' via the mechanical coupling to LP spool 180 within turbine engine 100 to output power (302).

Figure 4:
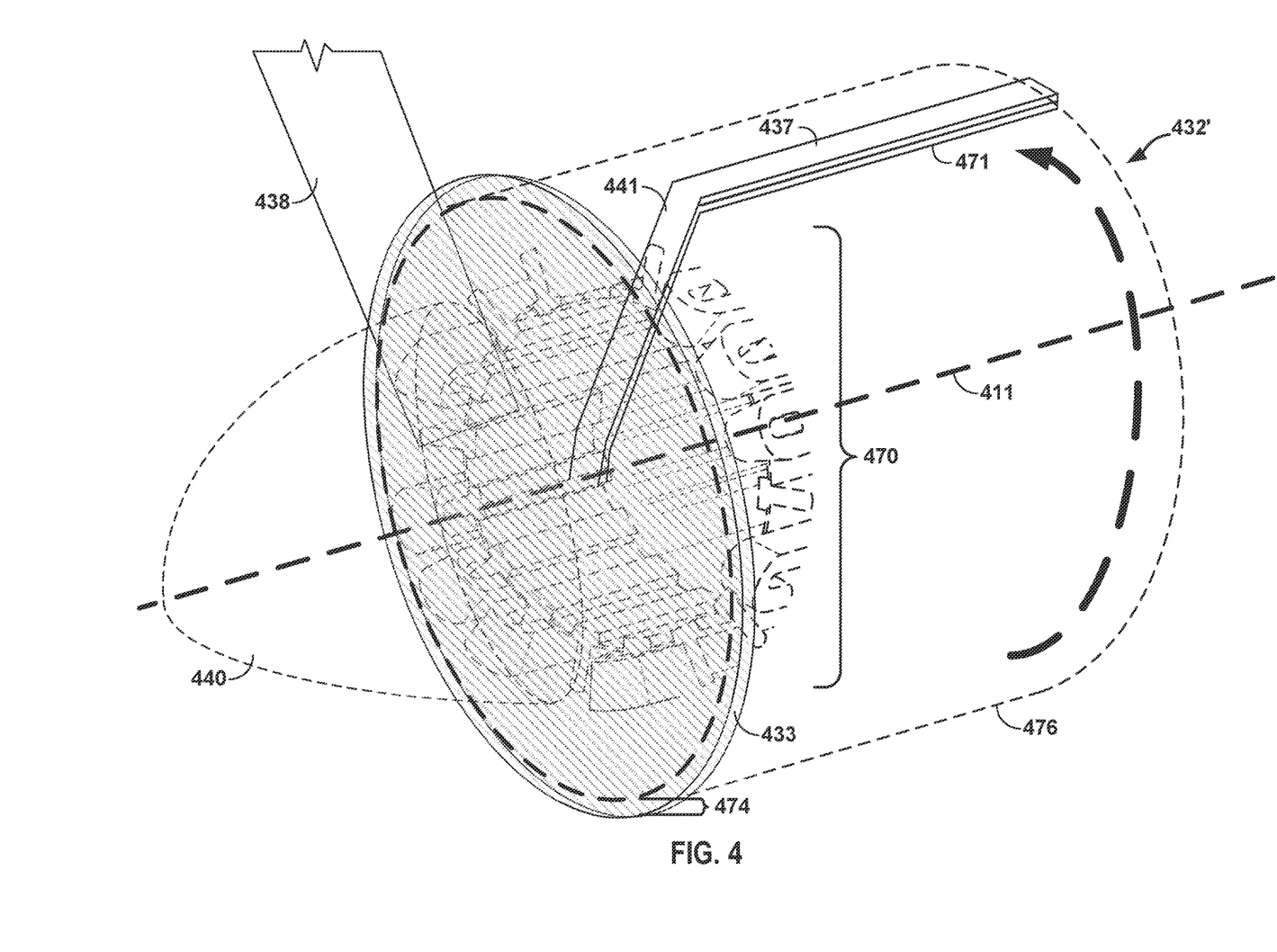
FIG. 4 is a conceptual diagram illustrating, in three dimensions, the electrical generator shown in the example of FIGS. 1-2B positioned in accordance with various aspects of the techniques described in this disclosure.

FIG. 4 is a conceptual diagram illustrating, in three dimensions, the electrical generator shown in the example of FIGS. 1-2B positioned in accordance with various aspects of the techniques described in this disclosure. An electrical generator 432' is shown in the example of FIG. 4, which may represent an example of any of generators 132, 232, and/or 232', but most closely represents electric generator 232' of FIG. 2B given that rotor 437 includes permanent magnets 471 similar to electrical generator 232'.

As shown in the example of FIG. 4, rotor 437 is disposed between a fan blade 438 (where only a single fan blade 438 is shown for ease of illustration purposes and represents an example of a fan blade forming fan 113) and a compressor such as compressor 114. Blade retainer 433 may provide an end closure fixture for electrical generator 432'. Rotor 437 may be formed from a single piece of metal or other material. Rotor 437 may represent, in other words, a single monolithic component with a rotor arm 441.

Blade retainer 433 may represent a backend retainer (where backend is defined relative to airflow) for fan blade(s) 438. Blade retainer 433 may retain or otherwise represent a fixture for securing a backend of fan blade(s) 438, where hub 440 may include (although not shown in the example of FIG. 4) a frontend blade retainer for retaining a frontend of fan blade(s) 438.

Seal 474 may be formed as a continuous part of blade retainer 433, which extends slightly outside of a housing 476 for electrical generator 432' (where housing 476 may be an internal structure to a turbine engine that extends back into the core of the turbine engine, and electrical engine 432' is displaced forward from the core of turbine engine 100 as noted above). Seal 474 may represent an integrated component of blade retainer 472 that provides a seal for housing 476 to prevent debris and/or air from entering electrical generator 432'. Alternatively, seal 474 may be a separate component from blade retainer 472.

Rotor 437 may be integrated with rotor arm 441 (which is mechanically coupled to blade retainer 433 as a separate component). Rotor arm 441 may have an angle relative to blade retainer 433 of less than 90 degrees, 90 degrees, or more than 90 degrees. In other words, blade retainer 433 is a separate monolithic piece from rotor 437, where rotor 437 is mechanically attached to separate blade retainer 433 in order to be rotationally coupled to separate blade retainer 433. Rotor 437 may therefore be rotationally coupled to blade retainer 433 via rotor arm 441 that is mechanically coupled to blade retainer 472 and is angled less than 90 degrees relative to blade retainer 433. Blade retainer 433 may couple to a fan shaft (not shown in the example of FIG.

1) that is driven by the LP spool, thereby rotating rotor 437 and producing power through electromagnetic interaction between permanent magnets 471 and stator 470.

As such, various aspects of the techniques may enable the following examples.

Example 1A. A turbine engine comprising: a core section comprising: a low pressure turbine that drives a low pressure spool that rotates about a longitudinal axis of the turbine engine; a high pressure turbine that drives a high pressure spool; and a compressor rotated by the high pressure spool; a fan comprising a plurality of radially distributed blades, the fan connected to the low pressure spool and rotated by the low pressure spool, rotation of the plurality of radially distributed blades providing thrust to a vehicle that includes the turbine engine; and an electrical generator positioned between the fan and the compressor, wherein the electrical generator comprises: a rotor concentric with and rotated via the low pressure spool, the rotor configured to rotate about the longitudinal axis; and a stator positioned radially within the rotor and configured to electromagnetically interact with the rotor to generate power.

Example 2A. The turbine engine of example 1A, wherein rotor is rotationally coupled to a separate blade retainer via a rotor arm that is mechanically coupled to the blade retainer and is angled less than 90 degrees relative to the blade retainer.

Example 3A. The turbine engine of any of examples 1A and 2A, further comprising an oil sump, wherein the electrical generator is positioned radially outside of the oil sump, and wherein the oil sump is positioned to collect oil used to lubricate rotational elements for one or more of: the compressor, the low pressure turbine, and the high pressure turbine.

Example 4A. The turbine engine of any of examples 1A-3A, wherein the electrical generator is positioned adjacent to a cool air intake for a core vane assembly.

Example 5A. The turbine engine of any of examples 1A-4A, wherein the low pressure spool is configured to rotate at a slower speed than the high pressure spool, and wherein the turbine engine further comprises a separate blade retainer to which the rotor is rotationally coupled and is also rotationally coupled to the low pressure spool such that the rotor rotates at the slower speed than the high pressure spool.

Example 6A. The turbine engine of any of examples 1A-5A, wherein the electrical generator is not attached to a auxiliary gearbox mechanically coupled to the core section.

Example 7A. The turbine engine of any of examples 1A-6A, wherein the electrical generator is a permanent magnet electrical generator in which permanent magnets are attached to the rotor.

Example 8A. The turbine engine of any of examples 1A-7A, wherein the turbine engine provides the thrust to an airframe.

Example 9A. A method comprising: operating a turbine engine to provide thrust to a vehicle that includes the turbine engine, wherein the turbine engine comprises: a core section comprising: a low pressure turbine that drives by a low pressure spool; and a high pressure turbine that drives by a high pressure spool; a compressor rotated by the high pressure spool; a fan comprising a plurality of radially distributed blades, the fan connected to the low pressure spool and rotated by the low pressure spool, rotation of the plurality of radially distributed blades providing thrust to a vehicle that includes the turbine engine; and an electrical generator positioned between the fan and the compressor, wherein the electrical generator comprises: a rotor concentric with and rotated via the low pressure spool, the rotor configured to rotate about the longitudinal axis; and a stator positioned radially within the rotor and configured to electromagnetically interact with the rotor to generate power; and operating the electrical generator via the mechanical connection to the turbine engine to output power.

Example 10A. The method of example 9A, wherein rotor is rotationally coupled to a separate blade retainer via a rotor arm that is mechanically coupled to the blade retainer and is angled less than 90 degrees relative to the blade retainer.

Example 11A. The method of any of examples 9A and 10A, further comprising an oil sump, wherein the electrical generator is positioned radially outside of the oil sump, and wherein the oil sump is positioned to collect oil used to lubricate rotational elements for one or more of: the compressor, the low pressure turbine, and the high pressure turbine.

Example 12A. The method of any of examples 9A-11A, wherein the electrical generator is positioned adjacent to a cool air intake for a core vane assembly.

Example 13A. The method of any of examples 9A-12A, wherein the low pressure spool is configured to rotate at a slower speed than the high pressure spool, and wherein the turbine engine further comprises a separate blade retainer to which the rotor is rotationally coupled and is also rotationally coupled to the low pressure spool such that the rotor rotates at the slower speed than the high pressure spool.

Example 14A. The method of any of examples 9A-13A, wherein the electrical generator is not attached to a auxiliary gearbox mechanically coupled to the core section.

Example 15A. The method of any of examples 9A-14A, wherein the electrical generator is a permanent magnet electrical generator in which permanent magnets are attached to the rotor.

Example 16A. The method of any of examples 9A-15A, wherein the turbine engine provides the thrust to an airframe.

Example 17A. An aircraft comprising: an airframe; and a turbine engine coupled to the airframe, the turbine engine comprising: a core section comprising: a low pressure turbine that drives a low pressure spool; and a high pressure turbine that drives a high pressure spool; a compressor rotated by the high pressure spool; a fan comprising a plurality of radially distributed blades, the fan connected to the low pressure spool and rotated by the low pressure spool, rotation of the plurality of radially distributed blades providing thrust to the airframe; and an electrical generator positioned between the fan and the compressor, wherein the electrical generator comprises: a rotor concentric with and rotated via the low pressure spool, the rotor configured to rotate about the longitudinal axis; and a stator positioned radially within the rotor and configured to electromagnetically interact with the combined rotor to generate power.

Example 18A. The aircraft of example 17A, wherein rotor is rotationally coupled to a separate blade retainer via a rotor arm that is mechanically coupled to the blade retainer and is angled less than 90 degrees relative to the blade retainer.

Example 19A. The aircraft of any of examples 17A and 18A, further comprising an oil sump, wherein the electrical generator is positioned radially outside of the oil sump, and wherein the oil sump is positioned to collect oil used to lubricate rotational elements for one or more of: the compressor, the low pressure turbine, and the high pressure turbine.

Example 20A. The aircraft of any of examples 17A-19A, wherein the electrical generator is positioned adjacent to a cool air intake for a core vane assembly.

Example 1B. A turbine engine comprising: a core section comprising: at least one compressor and at least one turbine that both rotate about a longitudinal axis of the turbine engine, wherein the at least one turbine drives at least one spool; and an oil sump positioned to collect oil used to lubricate rotational elements for one or more of the at least one compressor and the at least one turbine; a fan comprising a plurality of radially distributed blades and rotated by the at least one spool, the fan connected to the core section and configured to be rotated by the at least one spool, rotation of the plurality of radially distributed blades providing thrust to a vehicle that includes the turbine engine; and an electrical generator integrated into the core section and positioned outside of the oil sump, wherein the electrical generator comprises: a rotor rotated via the at least one spool, the rotor configured to rotate about the longitudinal axis; and a stator configured to electromagnetically interact with the rotor to generate power.

Example 2B. The turbine engine of example 1B, wherein rotor includes a rotor arm that is mechanically coupled to a blade retainer that retains at least one of the plurality of radially distributed blades and is angled less than 90 degrees relative to the blade retainer.

Example 3B. The turbine engine of any of examples 1B and 2B, wherein the electrical generator is positioned between the fan and the compressor.

Example 4B. The turbine engine of any of examples 1B-3B, wherein the electrical generator is positioned adjacent to a cool air intake for the core section.

Example 5B. The turbine engine of any of examples 1B-4B, wherein the at least one spool includes a low pressure spool, wherein the at least one turbine includes a low pressure turbine and a high pressure turbine, wherein the low pressure turbine drives the low pressure spool, wherein the high pressure turbine drives a high pressure spool, wherein the low pressure spool is configured to rotate at a slower speed than the high pressure spool, and wherein the rotor is rotationally coupled to the low pressure spool such that the rotor rotates at the slower speed than the high pressure spool.

Example 6B. The turbine engine of any of examples 1B-5B, wherein the electrical generator is not attached to an auxiliary gearbox mechanically coupled to the core section.

Example 7B. The turbine engine of any of examples 1B-6B, wherein the electrical generator is a permanent magnet electrical generator in which permanent magnets are attached to the rotor.

Example 8B. The turbine engine of any of examples 1B-7B, wherein the turbine engine provides the thrust to an airframe.

Example 9B. The turbine engine of any of examples 1B-8B, wherein the rotor is positioned radially outside of the stator.

Example 10B. A method comprising: operating a turbine engine to provide thrust to a vehicle that includes the turbine engine, wherein the turbine engine comprises: a core section including: at least one compressor and at least one turbine that both rotate about a longitudinal axis of the turbine engine, wherein the at least one turbine drives at least one spool; and an oil sump positioned to collect oil used to lubricate rotational elements for one or more of the at least one compressor and the at least one turbine; a fan comprising a plurality of radially distributed blades and rotated by the at least one spool, the fan configured to be rotated by the at least one spool, rotation of the plurality of radially distributed blades providing thrust to a vehicle that includes the turbine engine; and an electrical generator integrated into the core section and positioned radially outside of the oil sump, wherein the electrical generator comprises: a rotor rotated by the at least one spool, the rotor configured to rotate about the longitudinal axis; and a stator configured to electromagnetically interact with the rotor to generate power; and operating the electrical generator via a mechanical connection to the turbine engine to output power.

Example 11B. The method of example 10B, wherein rotor includes a rotor arm that is mechanically coupled to a blade retainer that retains at least one of the plurality of radially distributed blades and is angled less than 90 degrees relative to the blade retainer.

Example 12B. The method of any of examples 10B and 11B, wherein the electrical generator is positioned between the fan and the compressor.

Example 13B. The method of any of examples 10B-12B, wherein the electrical generator is positioned adjacent to a cool air intake for the core section.

Example 14B. The method of any of examples 10B-13B, wherein the at least one spool includes a low pressure spool, wherein the at least one turbine includes a low pressure turbine and a high pressure turbine, wherein the low pressure turbine drives the low pressure spool, wherein the high pressure turbine drives a high pressure spool, wherein the low pressure spool is configured to rotate at a slower speed than the high pressure spool, and wherein the rotor is rotationally coupled to the low pressure spool such that the rotor rotates at the slower speed than the high pressure spool.

Example 15B. The method of any of examples 10B-14B, wherein the electrical generator is not attached to an auxiliary gearbox mechanically coupled to the core section.

Example 16B. The method of any of examples 10B-15B, wherein the electrical generator is a permanent magnet electrical generator in which permanent magnets are attached to the rotor.

Example 17B. The method of any of examples 10B-16B, wherein the turbine engine provides the thrust to an airframe.

Example 18B. The method of any of claims 10B-17B, wherein the rotor is positioned radially outside of the stator.

Example 19B. An aircraft comprising: an airframe; and a turbine engine comprising: a core section including: at least one compressor and at least one turbine that both rotate about a longitudinal axis of the turbine engine, wherein the at least one turbine drives at least one spool; and an oil sump positioned to collect oil used to lubricate rotational elements for one or more of the at least one compressor and the at least one turbine; a fan comprising a plurality of radially distributed blades and rotated by the at least one spool, the fan connected to the core section and configured to be rotated by the at least one spool, rotation of the plurality of radially distributed blades providing thrust to a vehicle that includes the turbine engine; and an electrical generator integrated into the core section and positioned radially outside of the oil sump, wherein the electrical generator comprises: a rotor rotated via the at least one spool, the rotor configured to rotate about the longitudinal axis; and a stator configured to electromagnetically interact with the rotor to generate power.

Example 20B. The aircraft of example 19B, wherein rotor includes a rotor arm that is mechanically coupled to a blade retainer that retains at least one of the plurality of radially distributed blades and is angled less than 90 degrees relative to the blade retainer.

Various examples have been described. These and other examples are within the scope of the following claims.

What is claimed is:

1. A turbine engine comprising:
   a core section comprising:
      a low pressure turbine that drives a low pressure spool that rotates about a longitudinal axis of the turbine engine;
      a high pressure turbine that drives a high pressure spool; and
      a compressor rotated by the high pressure spool;
   a core vane assembly comprising a plurality of core vanes configured to shape a core flow of the turbine engine;
   a fan comprising a plurality of radially distributed blades, the fan connected to the low pressure spool and rotated by the low pressure spool, rotation of the plurality of radially distributed blades providing thrust to a vehicle that includes the turbine engine; and
   an electrical generator positioned between the fan and the compressor, wherein the electrical generator is positioned radially inwards of the core vane assembly, wherein an outer diameter of the electrical generator is greater than or equal to 70% of a diameter of the core vane assembly, and wherein the electrical generator comprises:
      a rotor concentric with and rotated via the low pressure spool, the rotor configured to rotate about the longitudinal axis; and
      a stator positioned radially within the rotor and configured to electromagnetically interact with the rotor to generate power.

2. The turbine engine of claim 1, wherein rotor is rotationally coupled to a separate blade retainer via a rotor arm that is mechanically coupled to the blade retainer and is angled less than 90 degrees relative to the blade retainer.

3. The turbine engine of claim 1, further comprising an oil sump,
   wherein the electrical generator is positioned radially outside of the oil sump, and
   wherein the oil sump is positioned to collect oil used to lubricate rotational elements for one or more of: the compressor, the low pressure turbine, and the high pressure turbine.

4. The turbine engine of claim 1, wherein the electrical generator is positioned adjacent to a cool air intake for a core vane assembly.

5. The turbine engine of claim 1,
   wherein the low pressure spool is configured to rotate at a slower speed than the high pressure spool, and
   wherein the turbine engine further comprises a separate blade retainer to which the rotor is rotationally coupled and is also rotationally coupled to the low pressure spool such that the rotor rotates at the slower speed than the high pressure spool.

6. The turbine engine of claim 1, wherein the electrical generator is not attached to an auxiliary gearbox mechanically coupled to the core section.

7. The turbine engine of claim 1, wherein the electrical generator is a permanent magnet electrical generator in which permanent magnets are attached to the rotor.

8. The turbine engine of claim 1, wherein the turbine engine provides the thrust to an airframe.

9. A method comprising:
   operating a turbine engine to provide thrust to a vehicle that includes the turbine engine, wherein the turbine engine comprises:
   a core section comprising:
      a low pressure turbine that drives by a low pressure spool;
      a high pressure turbine that drives by a high pressure spool; and
      a compressor rotated by the high pressure spool;
   a core vane assembly comprising a plurality of core vanes configured to shape a core flow of the turbine engine;
   a fan comprising a plurality of radially distributed blades, the fan connected to the low pressure spool and rotated by the low pressure spool, rotation of the plurality of radially distributed blades providing thrust to a vehicle that includes the turbine engine; and
   an electrical generator positioned between the fan and the compressor, wherein the electrical generator is positioned radially inwards of the core vane assembly, wherein an outer diameter of the electrical generator is greater than or equal to 70% of a diameter of the core vane assembly, and wherein the electrical generator comprises:
      a rotor concentric with and rotated via the low pressure spool, the rotor configured to rotate about a longitudinal axis of the turbine engine; and
      a stator positioned radially within the rotor and configured to electromagnetically interact with the rotor to generate power; and
   operating the electrical generator to output power.

10. The method of claim 9, wherein rotor is rotationally coupled to a separate blade retainer via a rotor arm that is mechanically coupled to the blade retainer and is angled less than 90 degrees relative to the blade retainer.

11. The method of claim 9, further comprising an oil sump,
    wherein the electrical generator is positioned radially outside of the oil sump, and
    wherein the oil sump is positioned to collect oil used to lubricate rotational elements for one or more of: the compressor, the low pressure turbine, and the high pressure turbine.

12. The method of claim 9, wherein the electrical generator is positioned adjacent to a cool air intake for a core vane assembly.

13. The method of claim 9,
    wherein the low pressure spool is configured to rotate at a slower speed than the high pressure spool, and
    wherein the turbine engine further comprises a separate blade retainer to which the rotor is rotationally coupled and is also rotationally coupled to the low pressure spool such that the rotor rotates at the slower speed than the high pressure spool.

14. The method of claim 9, wherein the electrical generator is not attached to an auxiliary gearbox mechanically coupled to the core section.

15. The method of claim 9, wherein the electrical generator is a permanent magnet electrical generator in which permanent magnets are attached to the rotor.

16. The method of claim 9, wherein the turbine engine provides the thrust to an airframe.

17. An aircraft comprising:
    an airframe; and
    a turbine engine coupled to the airframe, the turbine engine comprising:
       a core section comprising:
          a low pressure turbine that drives a low pressure spool; and
          a high pressure turbine that drives a high pressure spool;
       a compressor rotated by the high pressure spool;
       an oil sump positioned to collect oil used to lubricate rotational elements;

a fan comprising a plurality of radially distributed blades, the fan connected to the low pressure spool and rotated by the low pressure spool, rotation of the plurality of radially distributed blades providing thrust to the airframe; and an electrical generator positioned between the fan and the compressor, wherein the electrical generator is positioned outside the oil sump, and wherein the electrical generator comprises:

a rotor concentric with and rotated via the low pressure spool, the rotor configured to rotate about a longitudinal axis of the turbine engine; and a stator positioned radially within the rotor and configured to electromagnetically interact with the combined rotor to generate power.

18. The aircraft of claim 17, wherein rotor is rotationally coupled to a separate blade retainer via a rotor arm that is mechanically coupled to the blade retainer and is angled less than 90 degrees relative to the blade retainer.

19. The aircraft of claim 17, wherein the electrical generator is positioned adjacent to a cool air intake for a core vane assembly.

\* \* \* \* \*